United States Patent
Tomic et al.

[11] Patent Number: 5,878,468
[45] Date of Patent: Mar. 9, 1999

[54] CLOSURE ARRANGEMENT FOR RECLOSABLE BAG AND METHOD THEREOF

[75] Inventors: Mladomir Tomic, Appleton; Timothy J. May, Greenville, both of Wis.

[73] Assignee: Reynolds Consumer Products, Inc., Appleton, Wis.

[21] Appl. No.: 786,511

[22] Filed: Jan. 21, 1997

Related U.S. Application Data

[63] Continuation-in-part of Ser. No. 651,071, May 22, 1996, Pat. No. 5,617,770.

[51] Int. Cl.$^6$ .............................. A44B 19/16; B65D 33/16
[52] U.S. Cl. ................................ 24/576; 24/575; 24/587; 383/63
[58] Field of Search .............................. 24/577, 576, 575, 24/399, 400, 587, 586; 383/63–66

[56] References Cited

U.S. PATENT DOCUMENTS

| | | | |
|---|---|---|---|
| 3,557,413 | 1/1971 | Engle | 24/575 |
| 5,070,584 | 12/1991 | Dais et al. | 24/587 |
| 5,138,750 | 8/1992 | Gundlach et al. | 24/587 |
| 5,140,727 | 8/1992 | Dais et al. | 24/587 |
| 5,273,511 | 12/1993 | Boeckman | 493/195 |
| 5,307,552 | 5/1994 | Dais et al. | 24/587 X |
| 5,369,847 | 12/1994 | Naya et al. | 24/587 X |
| 5,403,094 | 4/1995 | Tomic | 24/587 X |
| 5,462,360 | 10/1995 | Tillman et al. | 24/587 X |
| 5,647,100 | 7/1997 | Porchia et al. | 24/587 X |

FOREIGN PATENT DOCUMENTS

| | | |
|---|---|---|
| 0 446 760 | 9/1991 | European Pat. Off. . |
| 0 510 797 | 10/1992 | European Pat. Off. . |
| 0 647 415 | 4/1995 | European Pat. Off. . |

*Primary Examiner*—Anthony Knight
*Assistant Examiner*—Robert J. Sandy
*Attorney, Agent, or Firm*—Alan M. Biddison

[57] ABSTRACT

A flexible bag includes a female profile and a male profile cooperatively arranged to inhibit interlock-blockage caused by small substances. The female profile includes first and second opposing legs. Each of the legs of the female profile includes a securing head at an extended end, a base adapted for attachment to the first panel section of the bag. A neck is between the securing head and the base. At least one of the first and second legs has a plurality of portions removed to form a first series of breaks. The portions removed include the securing head and the neck. The male profile is adapted for attachment to the second panel section of the bag, and is arranged to interlock with the first and second legs. A method of constructing a flexible bag, and a method for using a flexible bag are also described.

8 Claims, 6 Drawing Sheets

FIG. 5
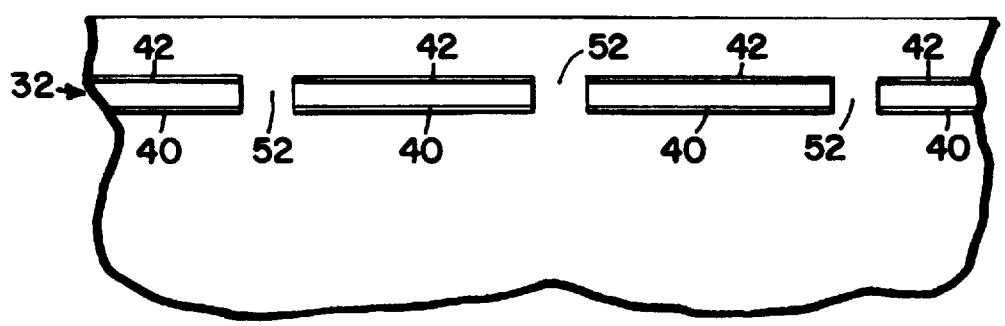
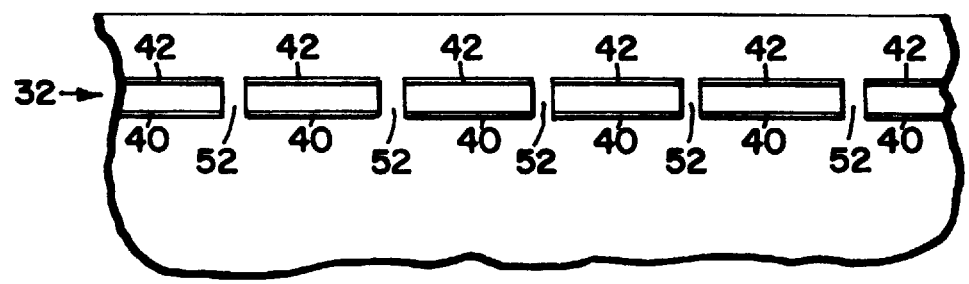
FIG. 6

CLOSURE ARRANGEMENT FOR RECLOSABLE BAG AND METHOD THEREOF

CROSS-REFERENCE TO RELATED APPLICATIONS

This application is a Continuation-in-Part application of commonly assigned U.S. application Ser. No. 08/651,071, filed on May 22, 1996 now U.S. Pat. No. 5,617,770.

FIELD OF THE INVENTION

The present invention relates to a closure arrangement for a reclosable bag. More particularly, the invention relates to a zipper having male and female profiles.

BACKGROUND OF THE INVENTION

Reclosable bags are put to use by consumers for many different applications. These bags often have zipper closure arrangements for sealing products within the bags. One type of zipper closure arrangement includes male and female profiles. The male profile typically may be tree-shaped, with an expanded head portion supported by a narrower trunk portion. The female profile is disposed opposite to the male profile and is adapted to mate with the male profile by a pair of legs having locking edges or cornered shoulders. The profiles are interlocked by aligning the male and female profiles and pressing them together along the entire length of the zipper. The opposing legs of the female profile slide over the expanded head portion of the male, and lock to it by hooking the head with the cornered shoulders and resting in the trunk portion.

If the bag is used for containing a product having small particles or grains, or a product which is dusty, conventional zippers can be problematic. Particles of the grain or dust may get caught between the female legs. When this happens, the male profile is often precluded from interlocking between the female legs because of the presence of the particles. As a result, the bag may not be completely sealed and may leak.

Consequently, a need exists for a zipper for a reclosable bag which overcomes the aforementioned shortcomings associated with existing zippers.

SUMMARY OF THE INVENTION

The present invention is directed to a zipper for a reclosable bag. The zipper comprises a female profile including first and second opposing legs and a male profile. Each of the legs of the female profile includes a securing head at an extended end, and a base adapted for attachment to the first panel section of the bag. A neck is between the securing head and the base. At least one of the first and second legs has a plurality of portions removed to form a first series of breaks. The portions removed include the securing head and the neck. The male profile is adapted for attachment to the second panel section of the bag, and is arranged to interlock with the first and second legs.

In some arrangements, the first series of breaks includes a plurality of portions removed from both the first and second legs. The portions removed include the securing head and the neck.

In certain implementations, the breaks are spaced apart by a distance within a range of $\frac{1}{32}$ to $\frac{1}{16}$ inch. In some implementations, the first series of breaks is spaced about one break every 2 inches.

The male profile includes an attachment portion adapted for attachment to the second panel section, a securing member at an extended end, and a stem between the attachment portion and the securing member. In some arrangements, the male profile includes a second plurality of portions removed to form a second series of breaks. The second plurality of portions removed includes the securing member and the stem. In one implementation, the second series of breaks is spaced apart by a distance of about $\frac{1}{32}$ inch to about $\frac{1}{16}$ inch. In other implementations, the second series of breaks is spaced about one break every 2 inches.

Certain arrangements include the male profile having a cross-sectional T-like shape. Some arrangements include each of the first and second legs of the female profile having a cross-sectional J-like shape.

The present invention is also directed to a reclosable bag including first and second opposed panel sections. The bag comprises a female profile and a male profile. The female profile includes first and second opposing legs each having a securing head at an extended end, a base attached to the first panel section of the bag, and a neck between the securing head and the base. At least one of the first and second legs have a first plurality of portions removed to form a first series of breaks. The first plurality of portions removed includes the securing head and the neck. The male profile includes an attachment portion attached to the second panel section, a securing member at an extended end arranged to engage the first and second legs, and a stem between the attachment portion and the securing member. A second plurality of portions are removed to form a second series of breaks. The second plurality of portions removed include the securing member and the stem.

In one implementation, the first series of breaks includes a plurality of portions removed from both the first and second legs. The portions removed include the securing head and the neck.

In another implementation, the first series of breaks are spaced apart at a distance of about $\frac{1}{32}$ inch. In other arrangements, the second series of breaks are spaced apart at a distance of about one break every two inches.

In yet another implementation, the first and second panel sections are joined together along three edges to create an enclosed region for holding a granular product.

The present invention is also directed to a method for constructing a reclosable bag. The method for constructing comprises providing a continuous film of polymeric material. A female profile attached to a web and having first and second opposed legs each including a securing head at an extended end, a base adapted for attachment to the bag, and a neck between the securing head and the base is provided. At least one of the first and second legs is punched to remove a slug including the neck and securing head. A male profile adapted for attachment to the bag and arranged to interlock with the first and second legs is provided. The base of the female profile is attached to the film. The male profile is attached to the film.

In some implementations, the step of punching includes punching both the first and second legs to remove portions of the neck and securing head from both the first and second legs.

In at least one certain arrangement, the method includes punching the male profile to remove sections of the male profile.

In another specific implementation, the step of attaching the base of the female profile to the film includes heat sealing the base to the film, and the step of attaching the male profile to the film includes heat sealing the male profile to the film.

One method further includes the steps of folding the film to form first and second opposed panel sections, and heat sealing the first and second panel sections along three edges to create an enclosed region for holding a granular product.

Another aspect of the present invention is directed to a method of using a reclosable bag. The method comprises providing a bag. The bag includes first and second opposed panel sections with three sealed edges to form an enclosed region, a mouth providing access to the enclosed region, and a zipper closure arrangement adjacent to the mouth including a series of breaks in the arrangement. The enclosed region of the bag is at least partially filled through the mouth with a product comprised of a plurality of individual grains. The zipper closure arrangement is closed and forces out individual grains from the zipper closure arrangement through the series of breaks.

In one implementation, the step of providing includes providing a bag including a zipper closure arrangement having opposed male and female profiles. The female profile includes the series of breaks. The step of closing includes aligning the male and female profiles, allowing the individual grains to fall through the series of breaks, and interlocking the male and female profiles.

The above summary of the present invention is not intended to describe each disclosed embodiment of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings in which:

FIG. 5 is a sectional, elevational view of the female profile of the closure arrangement in FIG. 1, according to an embodiment of the present invention;

FIG. 6 is a sectional, elevational view of an alternate embodiment of the female profile of the closure arrangement in FIG. 1, according to an embodiment of the present invention;

Figure 1:
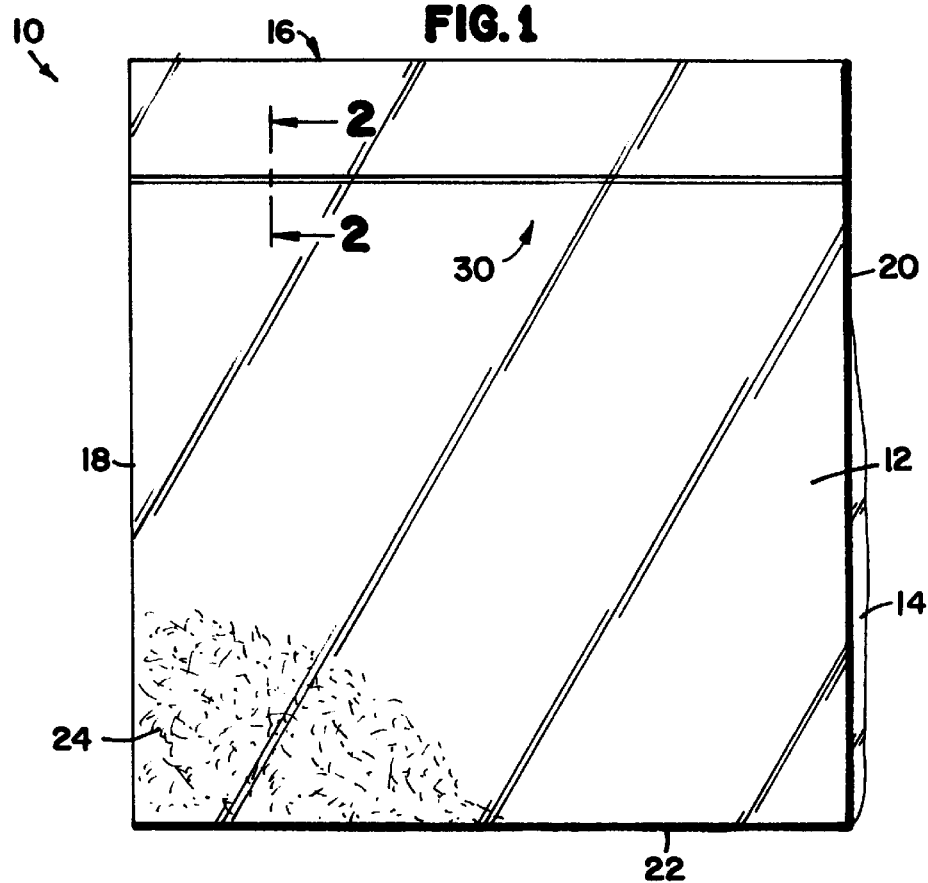
FIG. 1 is a perspective view of a zipper-closable bag according to an embodiment of the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE VARIOUS EMBODIMENTS

The present invention is directed to reclosable flexible packaging arrangements and has been found to be particularly beneficial for use in connection with reclosable packages, for example, plastic bags including zipper-type closure structures. With zipper-type closure structures, grainy or powdered materials stored in the bag may get stuck within the zipper and preclude its closure. The present invention addresses this problem in the context of the formation and structure of the interlocking components which form the respective closure structures.

Turning now to the drawings, FIG. 1 illustrates an exemplary packaging arrangement in the form of a reclosable, flexible bag 10 having a closure-type structure which is susceptible to the above-mentioned problem. In accordance with a specific embodiment of the present invention, flexible bag 10 is made of first and second opposed panel sections 12, 14 of a polymeric film. For many manufacturing applications, first and second panel sections 12, 14 are heat sealed together along two edges and meet at a fold line in order to form a three-edged containment section for product 24 within the interior of bag 10. Bag 10 includes side edges 18, 20 and a bottom edge 22. Access is provided to the interior of bag 10 through a mouth 16.

Product 24 may be a variety of edible food products such as cheese, meat, and various snack types. However, as will be demonstrated below, the arrangement is particularly advantageous to containing a product including small grains or powder-like substances. Such products include, among others, granulated sugar, powdered sugar, flour, salt, baking soda, flavor-coated crackers, laundry detergent, and sand.

Figure 2:
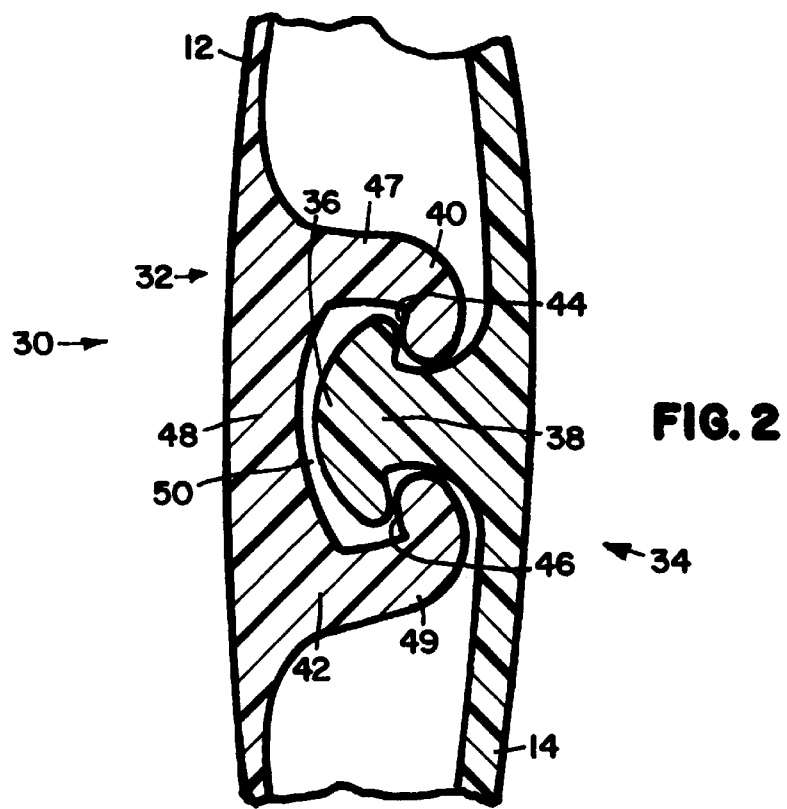
FIG. 2 is a cross-sectional view of the closure arrangement in FIG. 1 taken along line II—II according to an embodiment of the present invention.

One aspect of the present invention concerns the flexible bag's closure arrangement, which extends the length from side edge 18 to side edge 20. In the particular embodiment illustrated, the closure arrangement is a zipper illustrated generally at 30. As illustrated in FIG. 2, zipper 30 includes an elongated female profile shown generally at 32 and an elongated male profile shown generally at 34. Female profile 32 is attached to first panel section 12, e.g., by a heat seal. Male profile 34 is similarly attached to second panel section 14. Female and male profiles 32, 34 cooperate by interlocking to allow bag 10 to be opened and reclosed at mouth 16.

Male profile 34 has a cross section which is generally T-shaped including a securing member 36 at an extended end and a stem 38 (FIG. 2). At the base of stem 38, male profile 34 is attached to second panel section 14 through a heat seal.

Female profile 32 includes a locking structure for enclosing and interlocking with male profile 34. As illustrated in FIG. 2, one example of a locking structure of female profile 32 includes first and second legs 40, 42. First and second legs 40, 42 have a J-shaped cross section and securing heads at 44, 46. Securing heads 44, 46 mechanically engage securing member 36 of male profile 34 in order to reclose bag 10 at mouth 16. First and second legs 40, 42 are joined by a common base 48, which is attached to first panel section 12 by a heat seal. First and second legs 40, 42 include necks 47, 49 between base 48 and securing heads 44, 46. A channel 50, located between first and second legs 40, 42, functions to contain head 36 of male profile 34. Other male and female profile shapes may be used as well.

Figure 3:
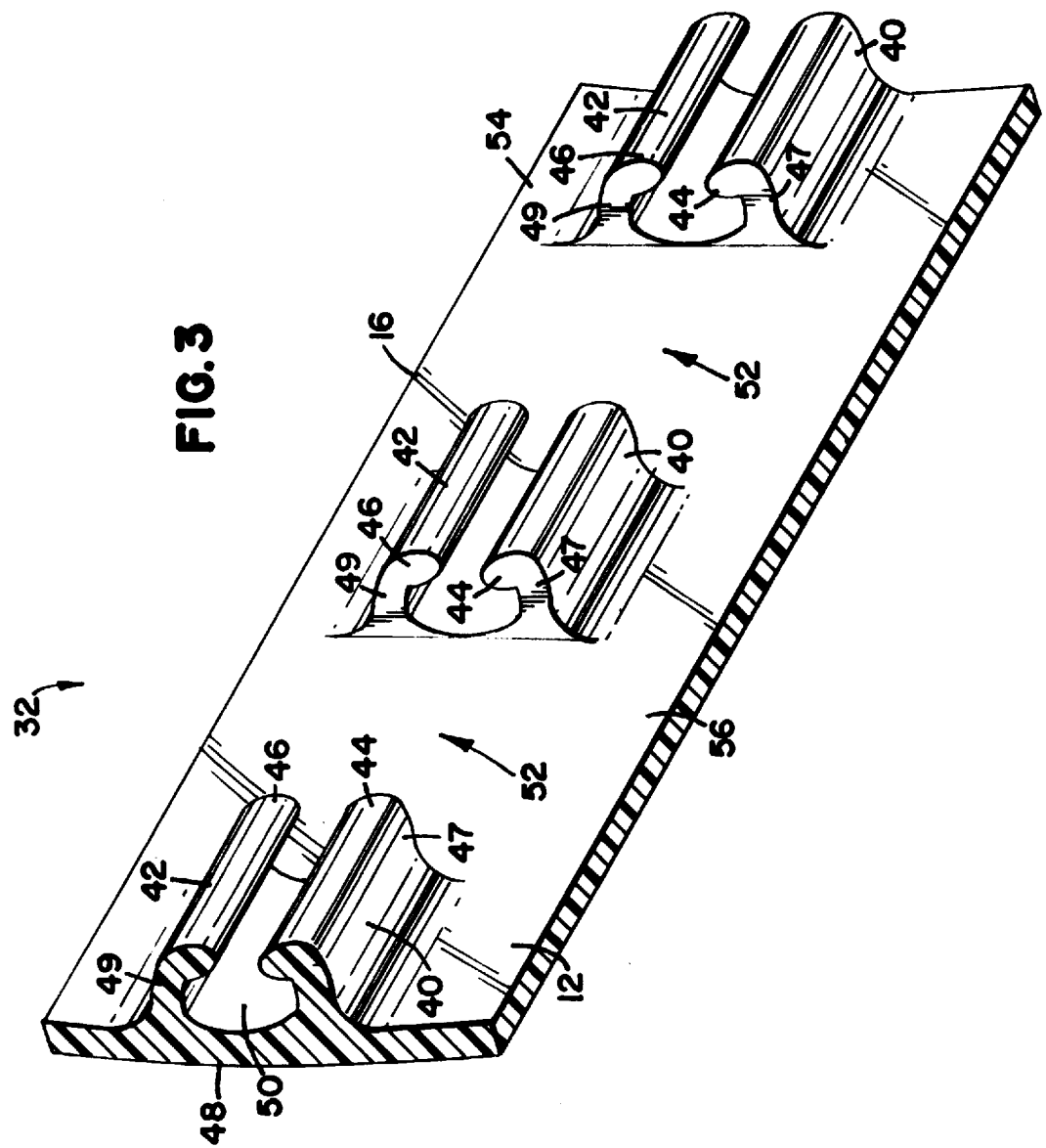
FIG. 3 is a sectional, perspective view of a female profile of the closure arrangement in FIG. 1, according to an embodiment of the present invention.

Female profile 32 is shown in more detail in FIG. 3. First and second portions 54 and 56, located on opposite sides of the first panel section 12, are regions of the polymeric film which generally support female profile 32 and which function as skirts when constructing female profile 32.

First and second legs 40, 42 oppose each other and extend across the length of bag 10 from side edge 18 to side edge 20. As illustrated in FIG. 3, first leg and second legs 40, 42 have a series of gaps or breaks 52 along their lengths. Breaks 52 are formed by removing sections of the securing heads 44, 46 and necks 47, 49, thereby providing a void from the free end of first and second legs 40, 42 to the base 48. By providing breaks 52 in the legs, certain advantages are achieved. In particular, when bag 10 is holding a grainy or dusty material, breaks 52 allow the grains or dust particles to fall out of channel 50 through the force of gravity to the bottom of the bag. Without breaks 52, substantial amounts of individual grains or dust particles could get trapped or lodged between first and second legs 40, 42. If that occurs, male profile 34 would not be able to interlock between first and second legs 40, 42 where the grainy particles were lodged. Thus, the integrity of the seal would be destroyed. With the gaps 52, however, this problem is avoided because grainy particles are allowed to fall to the bottom of bag 10 through the breaks 52.

Figure 4:
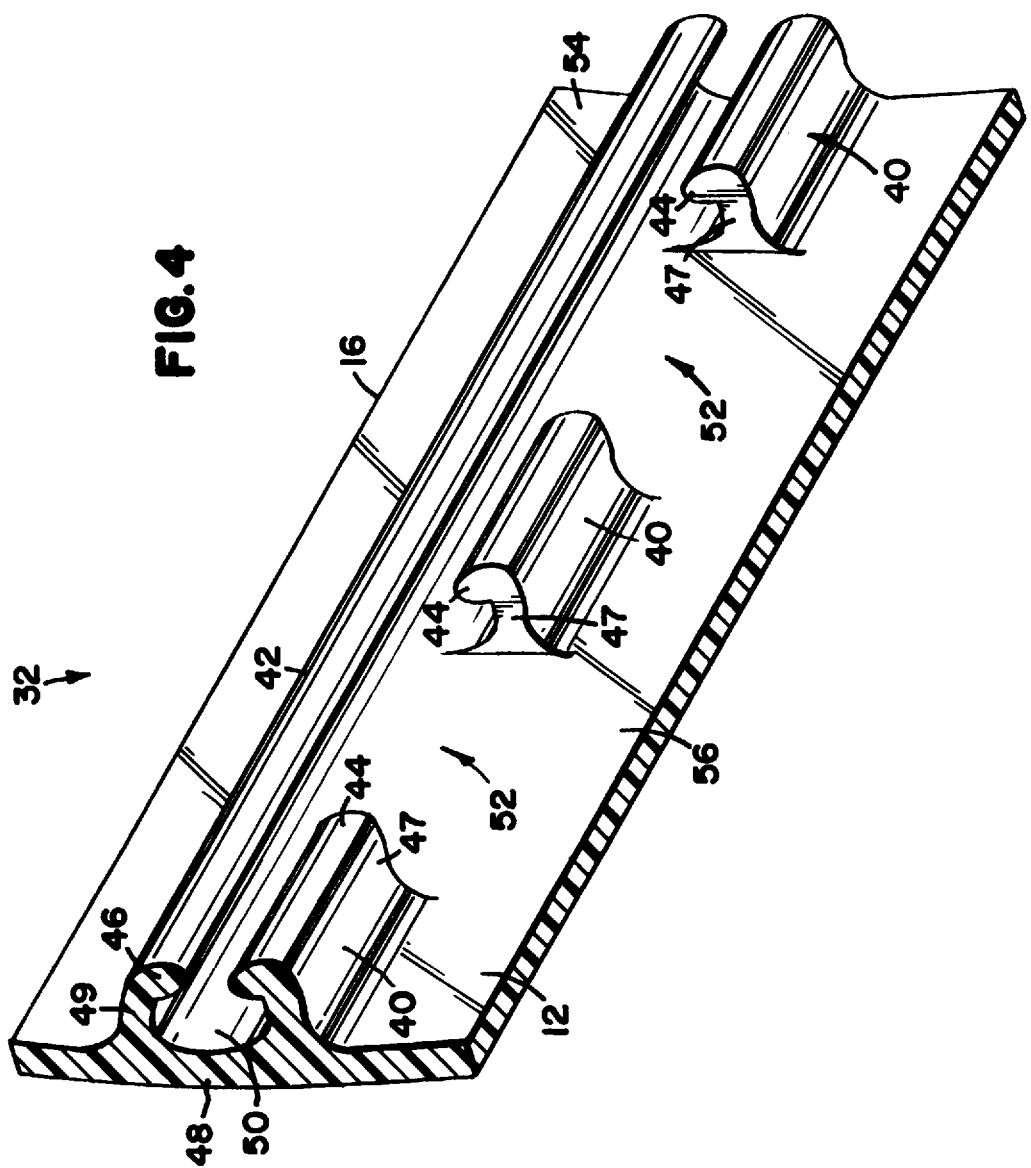
FIG. 4 is a sectional, perspective view of an alternate embodiment of the female profile of the closure arrangement in FIG. 1, according to an embodiment of the present invention.

An alternate embodiment of female profile 32 is illustrated in FIG. 4. In this embodiment, only first leg 40 includes the series of gaps or breaks 52 along its length. Second leg 42 is continuous from side edge 18 to side edge 20. First leg 40 is the leg which is closest to bottom edge 22. By providing breaks 52 in first leg 40, individual grains or dust particles are allowed to fall under the force of gravity out of channel 50 to the bottom of the bag.

The number of breaks 52 and the width of breaks 52 depend upon product 24 to be stored within bag 10. In one implementation, for example as illustrated in FIG. 5, breaks 52 are few in number and large in width. This implementation is particularly suitable for storage of a product with large particles or grain sizes. Width of breaks 52 are about ¹⁄₁₆ of an inch. There is provided about one break 52 for every two inches of female profile 32.

In another implementation, for example as illustrated in FIG. 6, breaks 52 are numerous, and width of breaks 52 are small. This implementation is particularly suitable for storage of a product with tiny particles or very small grain sizes. Width of breaks 52 is about ¹⁄₃₂ of an inch.

As illustrated in FIGS. 3 and 4, breaks 52 have a depth which extends from securing heads 44, 46 to base 48. However, for certain applications, breaks 56 need not extend this entire depth. Rather, the depth of breaks 52 is a function of the height of male profile 34 and of product 24 to be stored in bag 10. For example, when male profile 34 is short, and when grain size of product 24 is tiny, there is room between the end of securing member 36 and base 48 of female profile 32 for an individual particle or grain to rest while male and female profiles maintain a tight seal.

Figure 7:
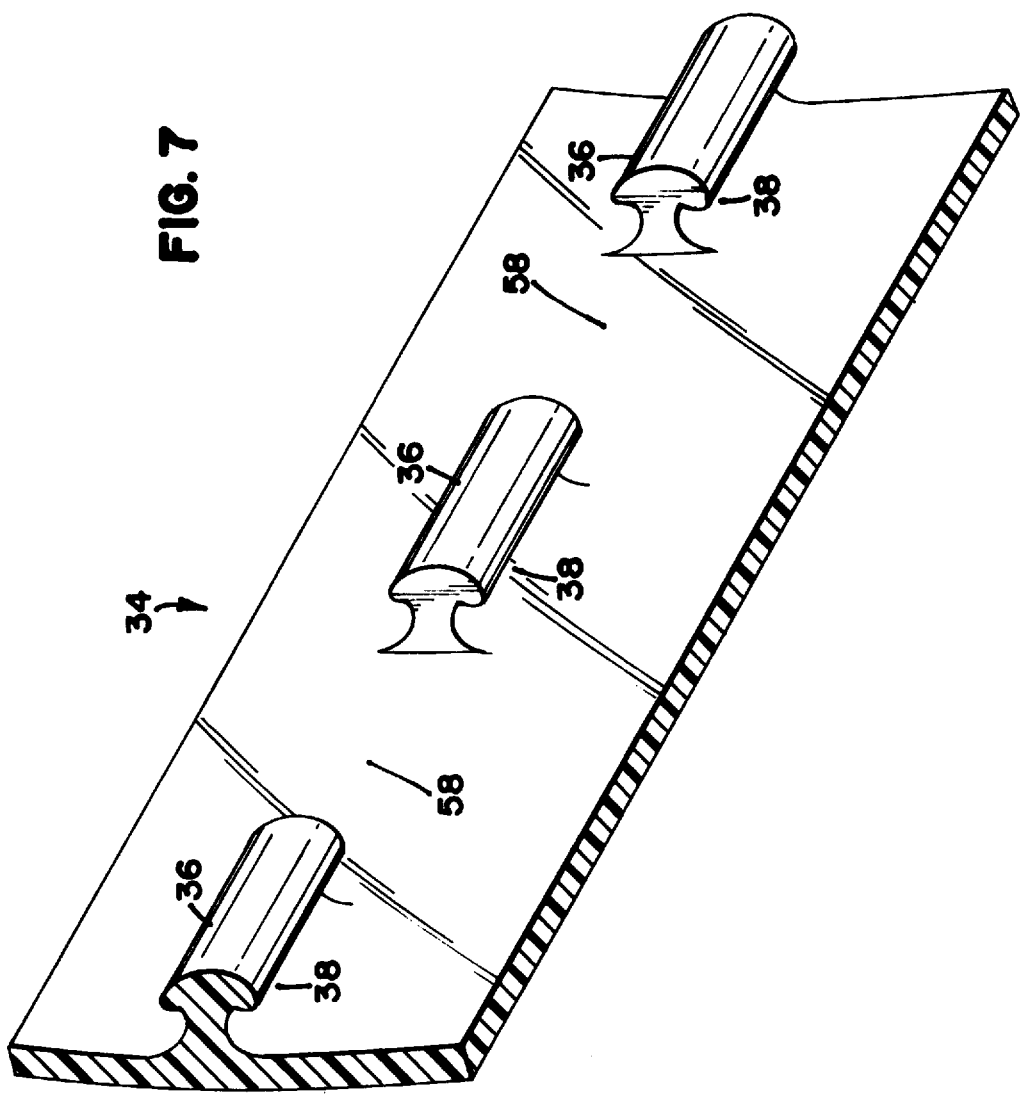
FIG. 7 is a sectional, perspective view of an alternate embodiment of the male profile of the closure arrangement in FIG. 1, according to an embodiment of the present invention.

In one implementation, male profile 34 includes a second series of breaks 58 along its length. One example of this implementation is illustrated in FIG. 7. Breaks 58 are formed by removing portions of securing member 36 and stem 38. The depth of breaks 58 extend from the free end of male profile 34 to its attachment portion. Breaks 58 in male profile 34 result in certain advantages. For example, for a product which is particularly difficult to displace or flow, breaks 58, in addition to breaks 52, help to allow individual grains or dust particles to fall out of channel 50 to the bottom of the bag. In addition, breaks 58 in male profile 34 also permit individual particles or grains to remain in channel 50 but not to interfere with the proper interlocking between male profile 34 and female profile 32. For example, where one individual particle may be trapped in channel 50, it would be overlapped by break 58 which allows the particle to rest in channel 50 without interference.

According to the present invention, the use of such a reclosable bag is best explained with reference to FIG. 1. Bag 10, including first and second opposed panel sections 12, 14 and zipper closure arrangement 30, is designed for packaging product 24. Product 24 includes a plurality of individual grains or particles and these particles are dispensed at least partially in the enclosed region of bag 10. In some implementations, the bag 10 is filled so that it includes direct contact between the individual particles or grains and the zipper closure arrangement 30. Zipper closure arrangement 30 is then closed by aligning the male and female profiles and allowing the individual grains or particles to fall through the breaks 52. Male and female profiles are then interlocked from side edge 18 to side edge 20.

Figure 8:
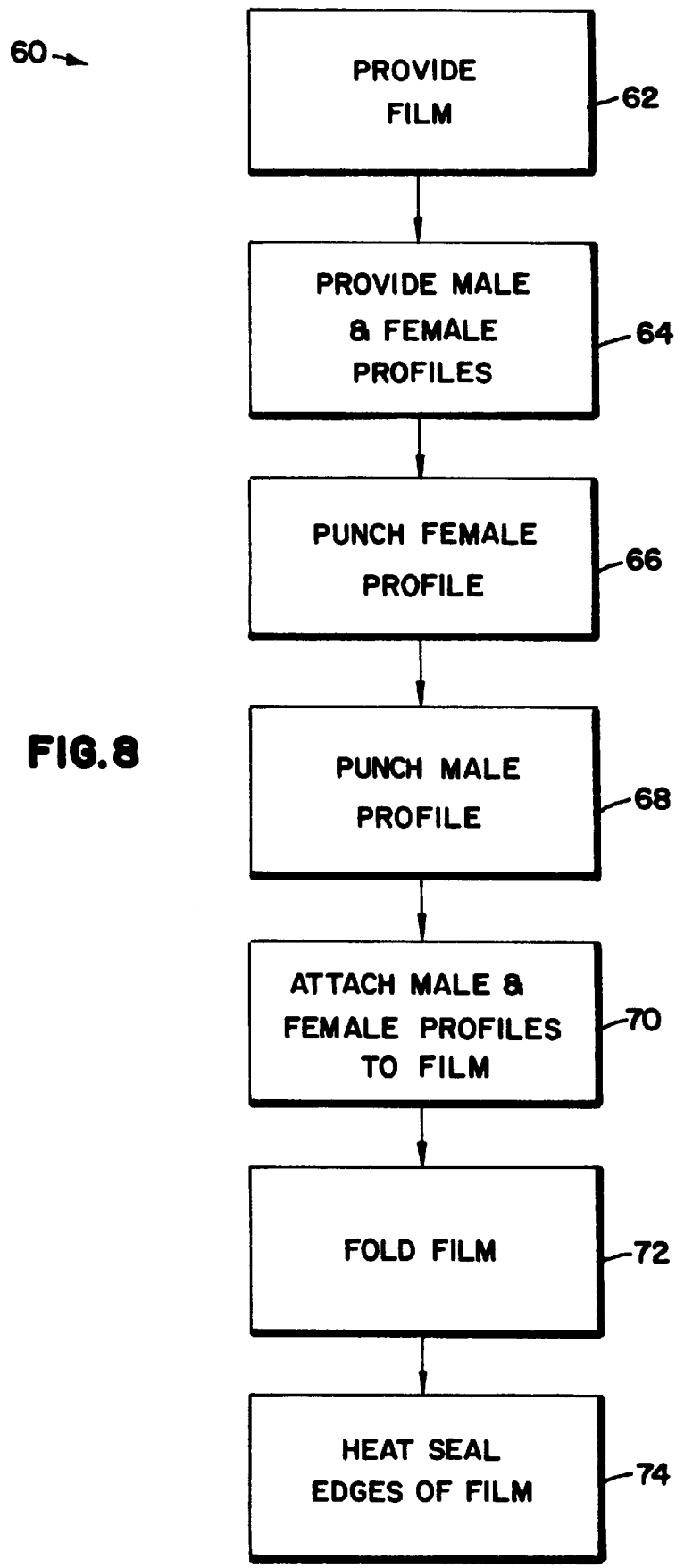
FIG. 8 is a flowchart illustrating a method according to an embodiment of the present invention.

One specific method for constructing a reclosable bag, according to one implementation of the present invention, is illustrated in FIG. 8 at 60. At step 62, a continuous film is provided. One implementation accomplishes this by extruding a polymeric material from a suitable extruder to provide a continuous sheet of polymeric film.

At step 64, the male and female profiles are provided. One way of implementing this step is by extruding a polyethylene material through a suitable die and cooling the profiles. The dies have the appropriate shape to provide the desired profile shape. For example, the female die is shaped such that a resulting profile has first and second opposed legs, each including a securing head at an extended end, a base, and a neck between the securing head and the base. Similarly, the desired shape of the male profile dictates the die shape. For example, one implementation includes the male die shaped such that the resulting profile results in a securing member at an extended end, a base, and a stem between the securing member and the base.

At steps 66 and 68, the male and female profiles are punched. One suitable way of accomplishing the punching operation is by use of a standard puncher. A slug including the neck and securing head of the female profile is removed by the puncher. Similarly, a slug including the securing member and stem of the male profile is removed by the puncher.

At step 70, the male and female profiles are attached to the film. In certain implementations, this is accomplished by heat sealing. The male and female profiles are positioned on the film such that when the film is folded, the male and female profiles align and are permitted to be interlocked.

At step 72, the film with the attached male and female profiles are folded, and the male and female profiles are aligned to allow them to be mated. At step 74, seals along edges 18, 20, and bottom edge 22 are provided. One technique for sealing is by heat sealing. This results in an enclosed region suitable for holding product 24.

It will be apparent to those skilled in the art that various modifications and variations can be made to the embodiments illustrated herein without departing from the scope or spirit of the invention. For example, a zipper having a peelable seal that provides a tamper indication can also be used with the embodiments illustrated herein. One example of a peelable seal can be found in U.S. Pat. No. 5,470,156, hereby incorporated by reference. Further, tear strings and notches may also be used with the embodiments illustrated herein. Such modifications and variations do not depart from the true scope and spirit of the invention which is set forth by the following claims.

We claim:

1. A zipper for a reclosable bag having first and second opposing panel sections, the zipper comprising:

a female profile including first and second opposing legs each including a securing head at an extended end, a base adapted for attachment to the first panel section of the bag, and a neck between the securing head and the base;

at least one of the first and second legs having a plurality of portions removed to form a first series of breaks, the portions removed including the securing head and the neck; and a male profile, adapted for attachment to the second panel section of the bag, arranged to interlock with the first and second legs, wherein the male profile includes an attachment portion adapted for attachment to the second panel section, a securing member at an extended end, and a stem between the attachment portion and the securing member and the male profile includes a second plurality of portions removed to form a second series of breaks, the second plurality of portions removed including the securing member and the stem.

2. The zipper of claim 1, wherein the first series of breaks includes a plurality of portions removed from both the first and second legs, the portions removed including the securing head and the neck.

3. The zipper of claim 2, wherein the breaks are spaced apart by a distance within a range of 1/32 inch to 1/16 inch.

4. The zipper of claim 2, wherein the first series of breaks is spaced about one break every 2 inches.

5. The zipper of claim 1, wherein the male profile has a cross-sectional T-like shape.

6. The zipper of claim 1, wherein each of the first and second legs of the female profile has a cross-sectional J-like shape.

7. The zipper of claim 1, wherein the second series of breaks is spaced apart by a distance within a range of 1/32 inch to about 1/16 inch.

8. The zipper of claim 1, wherein the second series of breaks is spaced about one break every 2 inches.

* * * * *